(12) United States Patent
Wirtanen et al.

(10) Patent No.: US 7,909,548 B2
(45) Date of Patent: Mar. 22, 2011

(54) SPHERICAL INTERNAL MOTION CUTTING TOOL

(75) Inventors: John R Wirtanen, Shelby Township, MI (US); Robert B. Peuterbaugh, Macomb, MI (US)

(73) Assignee: Joint Production Technology, Inc., Macomb, MI (US)

( * ) Notice: Subject to any disclaimer, the term of this patent is extended or adjusted under 35 U.S.C. 154(b) by 999 days.

(21) Appl. No.: 11/740,646

(22) Filed: Apr. 26, 2007

(65) Prior Publication Data

US 2008/0267727 A1 Oct. 30, 2008

(51) Int. Cl.
*B23B 5/40* (2006.01)
(52) U.S. Cl. .................. 409/132; 82/1.2; 82/1.5
(58) Field of Classification Search .......... 409/132; 82/1.2–1.5, 12, 1.1, 1.11; 408/159, 180; *B23B 5/40, B23B 41/00, 29/034*
See application file for complete search history.

(56) References Cited

U.S. PATENT DOCUMENTS

| | | | | |
|---|---|---|---|---|
| 4,176,565 A | * | 12/1979 | Christoph | 82/12 |
| 4,309,925 A | * | 1/1982 | Mottershead et al. | 82/12 |
| 5,086,676 A | | 2/1992 | Gifford et al. | |
| 5,209,145 A | * | 5/1993 | Baudermann | 82/1.5 |
| 5,211,088 A | | 5/1993 | Gifford | |
| 5,232,317 A | | 8/1993 | Peuterbaugh | |
| 5,967,007 A | * | 10/1999 | Scheer | 82/1.5 |

FOREIGN PATENT DOCUMENTS

| | | | |
|---|---|---|---|
| EP | 223152 A1 | * | 5/1987 |
| JP | 55024824 A | * | 2/1980 |
| JP | 57021209 A | * | 2/1982 |
| JP | 57149140 A | * | 9/1982 |
| JP | 61252001 A | * | 11/1986 |
| JP | 61252002 A | * | 11/1986 |
| JP | 2004237418 A | * | 8/2004 |

* cited by examiner

*Primary Examiner* — Daniel W Howell
(74) *Attorney, Agent, or Firm* — Young Basile

(57) ABSTRACT

A rotary motion cutting tool having an axis of rotation for cutting at least a portion of the spherical surface on an internal surface of a workpiece includes a rotary slide, a rotary actuator, and an actuating plate with a rotary surface machined therein. The rotary slide is rotatably supported with respect to a rotary axis extending generally perpendicular to the axis of rotation of the rotary motion cutting tool. The rotary actuator is rotatably supported with respect to the rotary slide for rotation about a rotary actuator support axis spaced radially from, and generally parallel with, the rotary axis of the rotary slide. The actuating plate is driven in reciprocal movement along the axis of rotation for interaction with the rotary actuator. Reciprocal movement of the actuating plate translates through the rotary surface and rotary actuator into rotary movement of the rotary slide through an arc about the rotary axis. Synchronized rotary movement of first and second rotary slides through first and second arcs about the rotary axis is provided while maintaining the rotational balance with respect to the axis of rotation of the rotary motion cutting tool. A process of operating the rotary motion cutting tool is disclosed.

20 Claims, 7 Drawing Sheets

SPHERICAL INTERNAL MOTION CUTTING TOOL

FIELD OF THE INVENTION

The present invention relates to a rotary motion cutting tool having an axis of rotation for machining (cutting) at least a portion of a spherical surface on an internal surface of a workpiece, and more particularly, to a spherical internal motion cutting tool for differential case workpieces machined with computer numeric controlled machines.

BACKGROUND

When attempting to shape or machine (cut) a spherical internal surface on a workpiece, it is known to rotate the workpiece relative to a static cutting tool. However, difficulties arise with this configuration when the workpieces are large, and/or rotationally unbalanced. It would be desirable to provide a rotary tool for cutting at least a partial, or a full, spherical surface on an internal surface of a workpiece. It would be desirable to provide a rough cut and finish cut to machine (cut) the spherical internal surface in a single pass. It would be desirable to provide a rotary tool that was balanced during the cutting process. It would be desirable to provide a rotary tool supported for maximum stability while machining at least a partial spherical surface on an internal surface of a workpiece. It would be desirable to provide adjustability for a roughing insert and micro adjustability for a finishing insert. It would be desirable to provide a rotary tool that can be mounted on a sub-spindle, secondary spindle, or spindle computer numeric controlled lathe. It would be desirable to provide a rotary tool that can be used on a computer numeric controlled machining center. It would be desirable to provide a rotary tool that can be used on any type of equipment that has the capability to pull, push, or turn for rotary actuation to occur.

SUMMARY

A rotary motion cutting tool according to one embodiment of the invention includes an axis of rotation for cutting at least a portion of a spherical surface on an internal surface of a workpiece. The rotary motion cutting tool can include at least one rotary slide rotatably supported with respect to a rotary axis extending generally perpendicular to the axis of rotation of the rotary tool. At least one rotary actuator can be rotatably supported with respect to the at least one rotary slide for rotation about a rotary actuator support axis spaced radially from, and generally perpendicular with, the rotary axis of at least one rotary slide. An actuating plate can be driven in reciprocal movement along the axis of rotation. The actuating plate can include a rotary surface machined therein for interaction with the rotary actuator. The reciprocal movement of the actuating plate can translate through the rotary surface and the rotary actuator into rotary movement of the rotary slide through an arc about the rotary axis.

In another embodiment of the rotary motion cutting tool, the rotary motion cutting tool can include a first rotary slide and a second rotary slide. Each rotary slide can be rotatably supported with respect to a common rotary axis extending generally perpendicular to the axis of rotation of the rotary motion cutting tool. A first rotary actuator and a second rotary actuator can be rotatably supported with respect to the first and second rotary slides, respectively, for rotation about first and second rotary actuator axes spaced radially from, and generally parallel with, the common rotary axis of the rotary slides. An actuating plate can be driven in reciprocal movement along the axis of rotation. The actuating plate can include a first rotary surface and a second rotary surface machined therein for interaction with the first and second rotary actuators, respectively. Reciprocal movement of the actuating plate translates through the first and second rotary surfaces, and the first and second rotary actuators, into synchronized rotary movement of the first and second rotary slides through first and second arcs about the rotary axis while maintaining rotational balance with respect to the axis of rotation of the rotary motion cutting tool.

A process for cutting at least a portion of a spherical surface on an internal surface of a workpiece with a rotary motion cutting tool having an axis of rotation can include orienting a main spindle or indexer (generically referred to herein as a first spindle) in a predetermined locked position, orienting a sub-spindle, secondary spindle, or spindle (generically referred to herein as a second spindle) in a predetermined start position, positioning the second spindle with respect to a workpiece to make contact with a live or dead center, a part fixture, a portion of a part, or anything (generically referred to herein as a force application surface) capable of causing an axial motion of the actuating plate to occur for at least a portion of spherical surface to be machined, rotating the second spindle while the first spindle remains stationary in the locked position, advancing the second spindle against spring pressure in the rotary motion cutting tool at a predetermined feed rate until a predetermined depth is reached, stopping rotation of the second spindle and orienting the second spindle to the start position.

Other applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DETAILED DESCRIPTION

Figures 1A, 2A:
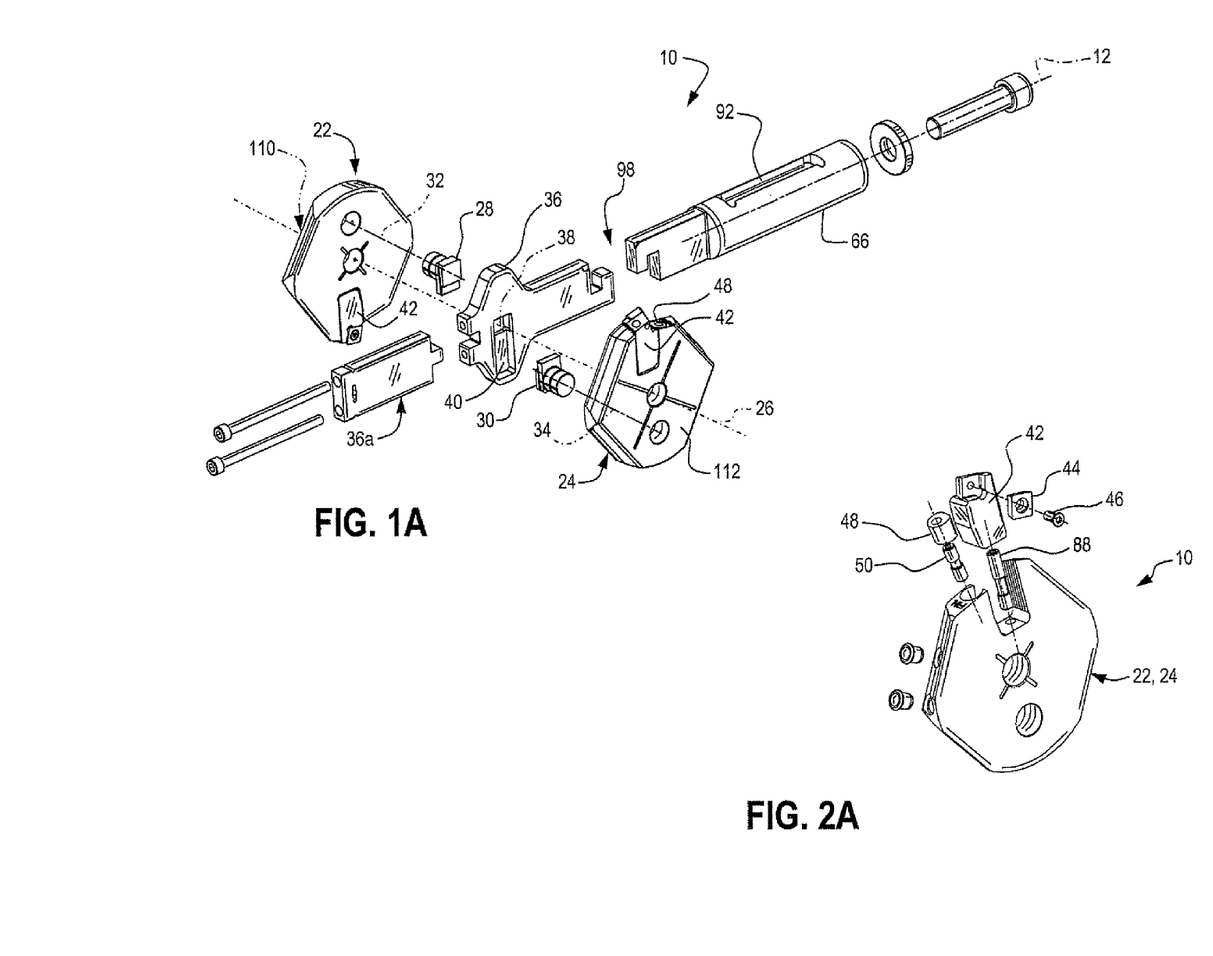
FIG. 1A is an exploded perspective view of an actuating plate with at least one rotary surface machined therein, at least one rotary actuator engageable with the rotary surface and rotatably supported with respect to at least one rotary slide.
FIG. 2A is a exploded perspective view of a rotary slide adjustably supporting at least one cutter support cartridge and at least one cutter connectible to the cutter support cartridge.
Figure 1B:
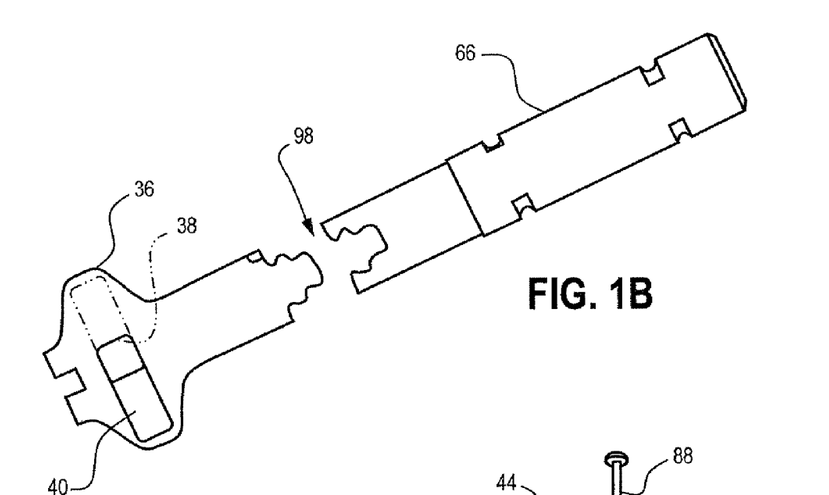
FIG. 1B is an exploded perspective view of an alternative actuating plate configuration with at least one rotary surface machined therein.
Figure 2B:
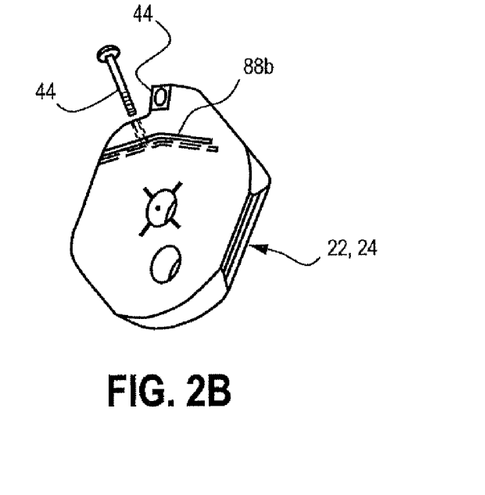
FIG. 2B is a exploded perspective view of a rotary slide supporting a cutter.
Figure 2C:
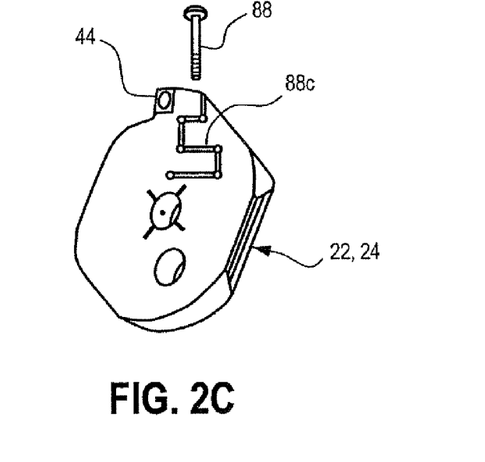
FIG. 2C is a exploded perspective view of a rotary slide supporting a cutter.
Figure 3:
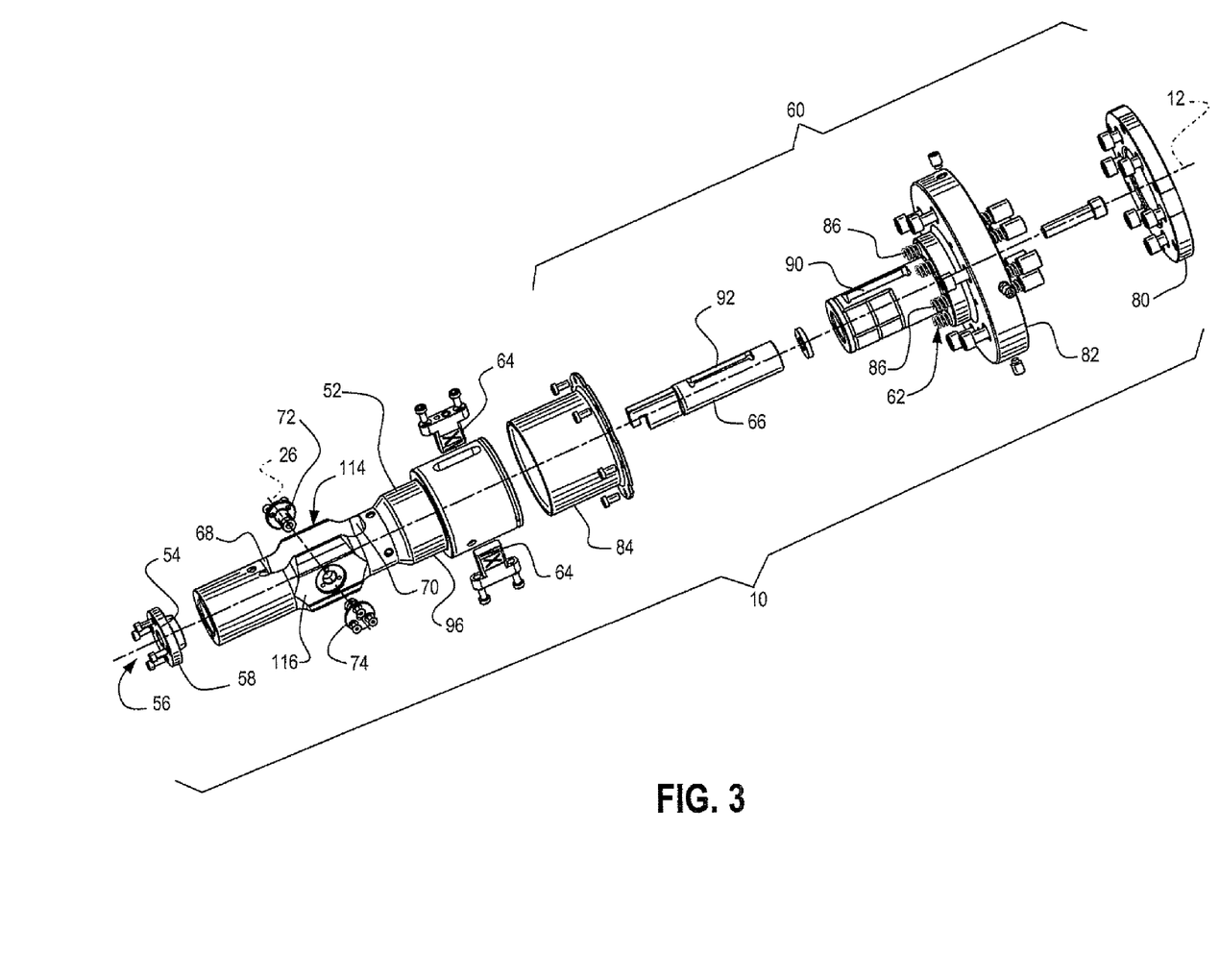
FIG. 3 is an exploded perspective view of the rotary motion cutting tool according to an embodiment of the present invention with some portions previously illustrated in FIGS. 1 and 2 not shown for the sake of simplicity.
Figure 4:
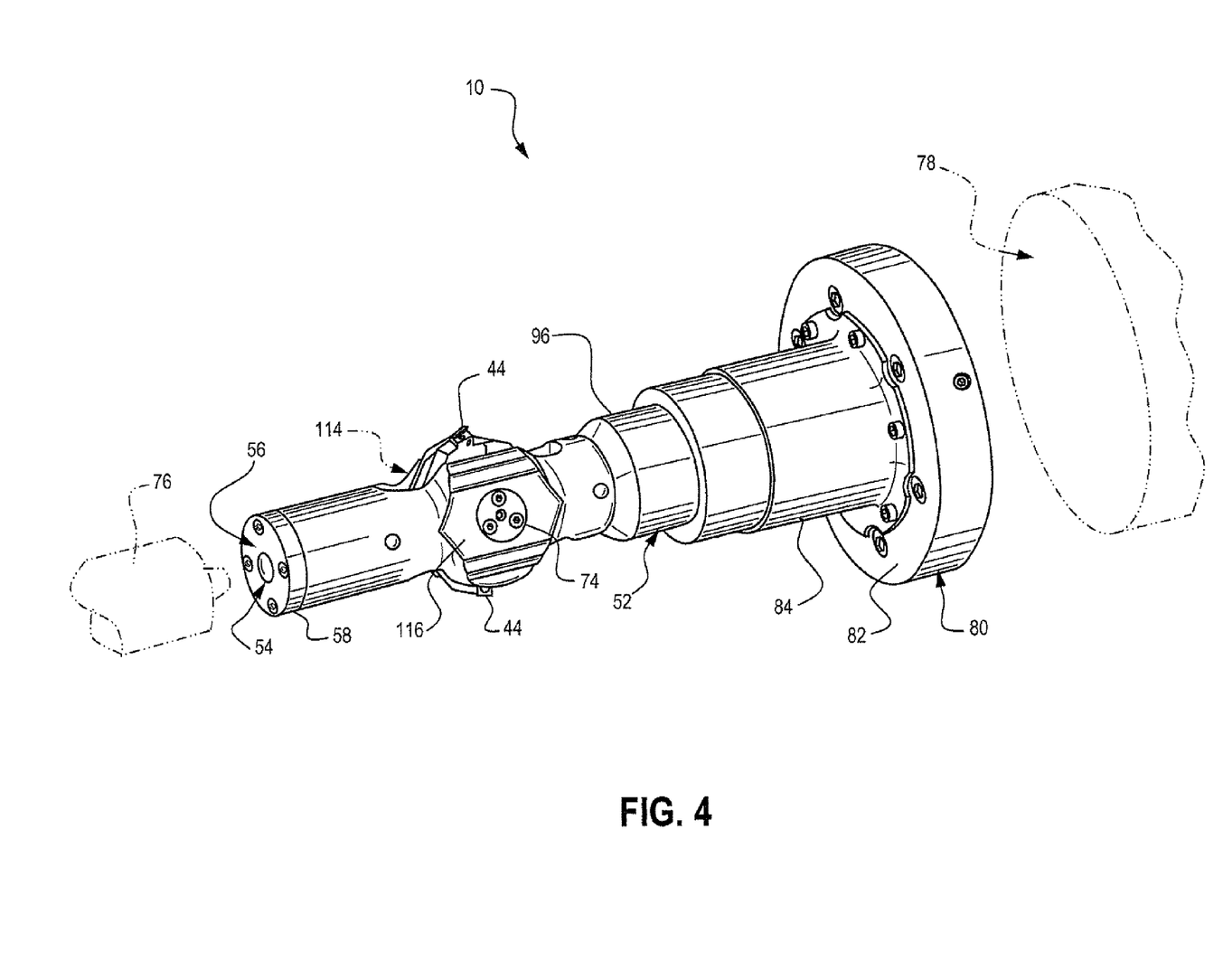
FIG. 4 is a perspective view of an assembled rotary motion cutting tool according to an embodiment of the invention as illustrated in FIGS. 1-3.
Figure 5:
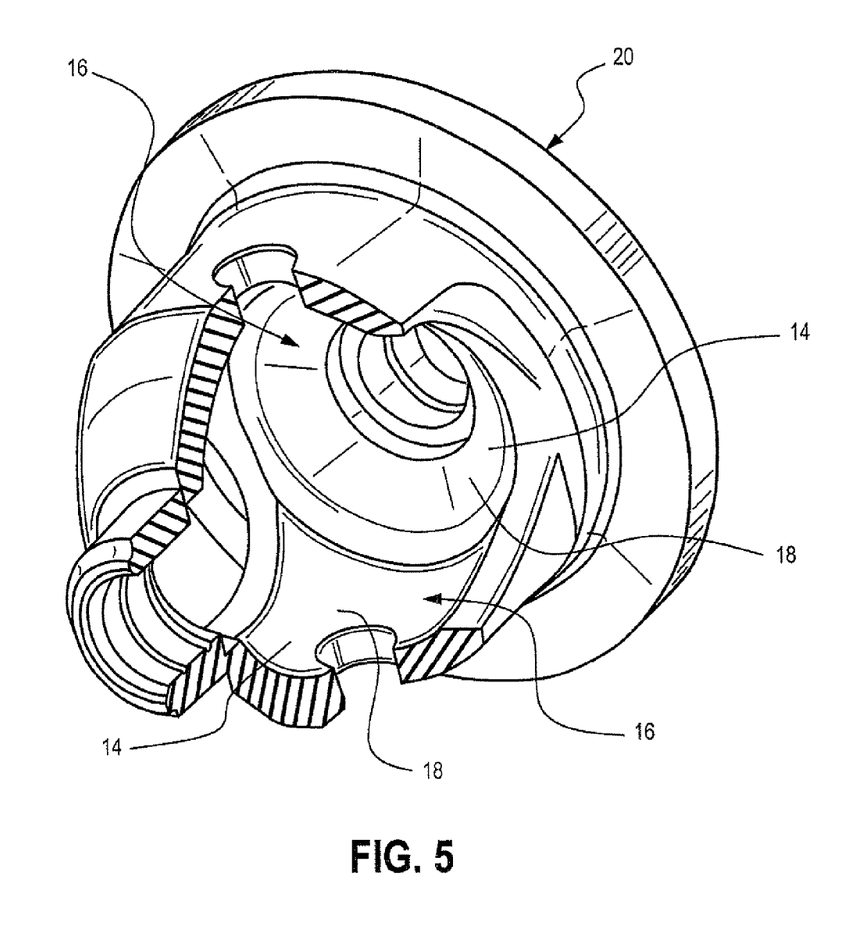
FIG. 5 is a partially cut away perspective view of a workpiece, such as a differential case, with at least a partial spherical internal surface machined by a rotary motion cutting tool according to an embodiment of the invention as illustrated in FIGS. 1-4.

Referring now to FIGS. 3-4, a rotary motion cutting tool 10 is illustrated having an axis of rotation 12 for cutting at least a portion 14 of a spherical surface 16 on an internal surface 18 of a workpiece 20 (best seen in FIG. 5). As best seen in FIGS. 1-2, the cutting tool 10 includes at least one rotary slide 22, 24 rotatably supported with respect to a rotary axis 26 extending generally perpendicular to the axis of rotation 12 of the rotary motion cutting tool 10. At least one rotary actuator 28, 30 is rotatably supported with respect to the at least one rotary slide 22, 24 for rotation about a rotary actuator support axis 32, 34 spaced radially from, and generally parallel with, the rotary axis 26 of the at least one rotary slide 22, 24. An actuating plate 36 is driven in reciprocal movement along the axis of rotation 12. The actuating plate 36 includes at least one rotary surface 38, 40 machined therein for interaction with the at least one rotary actuator 28, 30. Reciprocal movement of the actuating plate 36 translates through the at least one rotary surface 38, 40 and corresponding at least one rotary actuator 28, 30 into rotary movement of the at least one rotary slide 22, 24 through an arc about the rotary axis 26.

As best seen in FIG. 2A, at least one cutter support cartridge 42 is adjustably connected to the at least one rotary slide 22, 24. At least one cutter 44 is associated with each rotary slide 22, 24, or cutter support cartridge 42. The cutter 44 can be driven through an arc of movement about the rotary axis 26 in response to reciprocal movement of the actuating plate 36. An insert screw 46 can replaceably connect the cutter 44 to the cutter support cartridge 42. A cartridge stabilizer 48 can engage the cutter support cartridge 42. A differential screw 50 can connect the cartridge stabilizer 48 to the rotary slide 22 or 24. The cutter associated with each rotary slide can have a connection selected from a group including the cutter support cartridge 42 releasably engageable with the rotary slide 22, 24, a brazed joint between the cutter support cartridge 42 and the cutter 44, a glued joint between the cutter support cartridge 42 and the cutter 44, a permanently fixed joint between the cutter support cartridge 42 and the cutter 44, a releasable joint between the cutter support cartridge 42 and the cutter 44, a screwed joint between the cutter support cartridge 42 and the cutter 44, a wedged joint between the cutter support cartridge 42 and the cutter 44, a radial micro adjustment screw 88 associated with the cutter support cartridge 42 for adjusting a radial position of the cutter 44, a brazed joint between the cutter 44 and the rotary slide 22,24, a glued joint between the cutter 44 and the rotary slide 22, 24, a permanently fixed joint between the cutter 44 and the rotary slide 22, 24, a releasable joint between the cutter 44 and the rotary slide 22, 24, a screwed joint between the cutter 44 and the rotary slide 22, 24, a wedged joint between the cutter 44 and the rotary slide 22, 24, a radial micro adjustment screw 88 associated with the rotary slide 22, 24 for adjusting a radial position of the cutter 44, and any combination thereof.

As best seen in FIGS. 3-4, a sphere positioning body 52 is engageable with a workpiece 20 (best seen in FIG. 5) to be processed. The sphere positioning body 52 includes a sphere position center 54 at a distal end 56. The sphere position center 54 can be machined on an end plate 58 connected at the distal end 56 of the sphere positioning body 52. The sphere positioning body 52 can support the rotary slide 22, 24 (best seen in FIGS. 1-2) for rotation with respect to the rotary axis 26 and for rotation with respect to the axis of rotation 12 of the rotary motion cutting tool 10.

A feed control module 60 supports the sphere positioning body 52 for rotation therewith. The feed control module 60 is moveable axially with respect to the sphere positioning body 52. At least one biasing member 62 urges the sphere positioning body 52 axially away from the feed control module 60.

At least one linear aligner 64 extends through the sphere positioning body 52, the feed control module 60, and the actuating plate 36 or associated drive shaft 66 for the actuating plate 36. A primary stable support 68 and a secondary stable support 70 are associated with the sphere positioning body 52 for supporting the actuating plate 36 or the drive shaft 66 associated with the actuating plate 36. A rotary slide locating pivot 72, 74 is supported by the sphere positioning body 52 and operably engages the at least one rotary slide 22, 24.

As best seen in FIG. 4, the rotary motion cutting tool 10 according to an embodiment of the present invention can include a main spindle or indexer 76, and a sub-spindle, secondary spindle, or spindle 78. The main spindle or indexer 76 which hosts a part fixture is lockable in a predetermined orientation with respect to a workpiece 20 (best seen in FIG. 5) to be processed. The sub-spindle, secondary spindle, or spindle 78 is independently rotatable and independently axially moveable with respect to the main spindle or indexer 76. As best seen in FIG. 3, a spindle mounted pre-adapter for the sub-spindle, secondary spindle, or spindle 78 can be provided. An over-the-spindle steerable flange 82 can be mounted over the pre-adapter 80. A protective shell 84 is connected to the steerable flange 82 and extends axially to sheathe or telescopically enclose a portion of the sphere positioning body 52 and the at least one biasing member 62, such as a plurality of compression springs 86, for urging the sphere positioning body 52 axially away from the steerable flange 82 of the feed control module 60.

As best seen in FIG. 2A, a precision adjusting screw 88 can be provided for adjusting the position of the cutter 44 with respect to the corresponding cutter support cartridge 42 as will be described in greater detail below. As best seen in FIG. 2B and FIG. 2C, the cutter 44 can be brazed, glued, or otherwise permanently fixed to the cartridge 42, or to the rotary slide 22, 24 itself. By way of example and not limitation, radial micro adjustment can be accomplished by maneuvering the body material of the rotary slide 22, 24 to raise or lower the cutter 44 with an adjusting screw 88 interacting with a "Z-type" shape slot 88c as illustrated in FIG. 2C, or any other suitable shape 88b as illustrated in FIG. 2B, that can be wire cut into the rotary slide 22, 24. The radial micro adjustment can be performed manually, or automatically using a detente located within the machine.

In operation, a process for cutting at least a portion 14 of a spherical surface 16 on an internal surface 18 of a workpiece 20 with a rotary motion cutting tool 10 having an axis of rotation 12 includes orienting a main spindle or indexer 76 in a predetermined locked position, orienting a sub-spindle, secondary spindle, or spindle 78 in a predetermined start position, and positioning the sub-spindle, secondary spindle, or spindle 78 within the workpiece 20 to make contact with a live center, part fixture, the part itself or anything capable of causing an axial motion of the actuating plate for driving arcuate motion of at least one cutter 44 for machining at least a portion 14 of a spherical surface 16 to be machined on an internal surface 18 of the workpiece 20. The sub-spindle, secondary spindle, or spindle 78 is rotated while the main spindle or indexer 76 remains stationary in the locked position. The sub-spindle, secondary spindle, or spindle 78 is advanced against spring pressure 86 in the feed control module 60 of the rotary motion cutting tool 10 at a predetermined feed rate until a predetermined depth is reached. Rotation of the sub-spindle, secondary spindle, or spindle 78 is then stopped. The sub-spindle, secondary spindle, or spindle 78 is then reoriented to the start position.

During advancing movement of the sub-spindle, secondary spindle, or spindle 78 against spring pressure 86 in the rotary motion cutting tool 10, the steerable flange 82 moves axially toward the sphere positioning body 52 which is held axially in position by engagement of the sphere position center 54 at the distal end 56 of the sphere positioning body 52. As steerable flange 82 moves toward sphere positioning body 52, the rotary actuator, or actuating plate 36, or associated drive shaft 66 of actuating plate 36, is driven in relative axial movement resulting in pivoting movement of the first and second rotary slides 22, 24 about a common rotary axis 26 extending generally perpendicular to the axis of rotation 12 of the rotary motion cutting tool 10. Axial movement in combination with rotary movement of the rotary motion cutting tool 10 causes the cutter 44 connected to each cutter support cartridge 42 to be driven through an arc of movement about the rotary axis 26 in response to reciprocal axial movement of the actuating plate 36. Reciprocal axial movement of the actuating plate 36 translates through the first and second rotary surfaces 38, 40, and first and second rotary actuators 28, 30, into synchronized rotary movement of the first and second rotary slides 22, 24 through first and second arcs about the rotary axis 26 while maintaining rotational balance with respect to the axis of rotation 12.

During rotation of the sub-spindle, secondary spindle, or spindle 78, the sphere positioning body 52, feed control module 60, and the actuating plate, or drive shaft 66 associated with the actuating plate 36 are maintained in linear axial alignment with at least one linear aligner 64 extending radially inwardly toward the axis of rotation 12. The at least one linear aligner 64 operably engages with sidewalls of elongate slots 90, 92 machined in the steerable flange assembly 82 and drive shaft 66 associated with the actuating plate 36 allowing reciprocal axial movement of the steerable flange 82 and drive shaft 66 with respect to the sphere positioning body 52. The primary stable support 68 and secondary stable support 70 associated with the sphere positioning body 52 interact to stabilize the rotary actuating plate 36 during axial movement, while the entire rotary motion cutting tool is rotating during a cutting process. Rotary slide locating pivots 72, 74 are supported by the sphere positioning body 52 and operably engage the first and second rotary slides 22, 24 from opposite sides of the sphere positioning body 52 to define the common rotary axis 26.

A process to retract the rotary motion cutting tool from a workpiece can include the steps of positioning a turret-mounted tool retract system 94 (best seen in FIG. 7) to contact a body portion 96 of the rotary motion cutting tool 10. The sub-spindle, secondary spindle, or spindle 78 is retracted simultaneously with the turret-mounted tool retract system 94 in order to maintain the position of the cutters 44 from returning to the initial position in response to unloading the biasing members 62, such as the plurality of compression springs 86. After the rotary motion cutting tool 10 has been removed from the workpiece 20, the turret-mounted tool retract system 94 is fed in an axial direction to unload the stored spring pressure in the rotary motion cutting tool 10. The tool retract system 94 is slowly displaced axially with respect to the steerable flange 82 of the rotary motion cutting tool 10 as the spring pressure is being released. After the stored spring pressure in the rotary motion cutting tool 10 has been removed, the turret-mounting tool retract system 94 is removed from contact with the body portion 96 of the rotary motion cutting tool 10. When the rotary motion cutting tool 10 is separated from the tool retract system 94, the rotary motion cutting tool is ready to cut the next workpiece.

Figure 6:
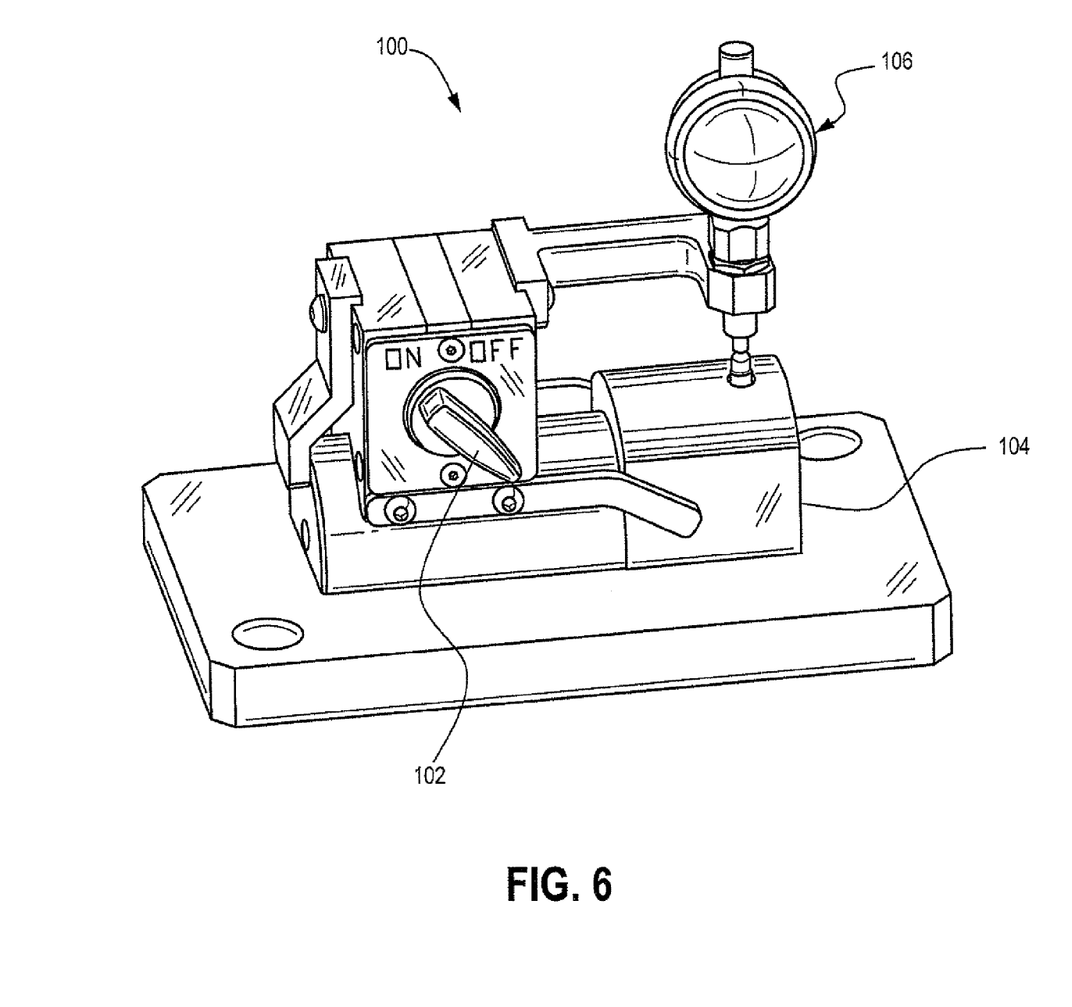
FIG. 6 is a perspective view of a cutter set-up gauge according to an embodiment of the present invention.
Figure 7:
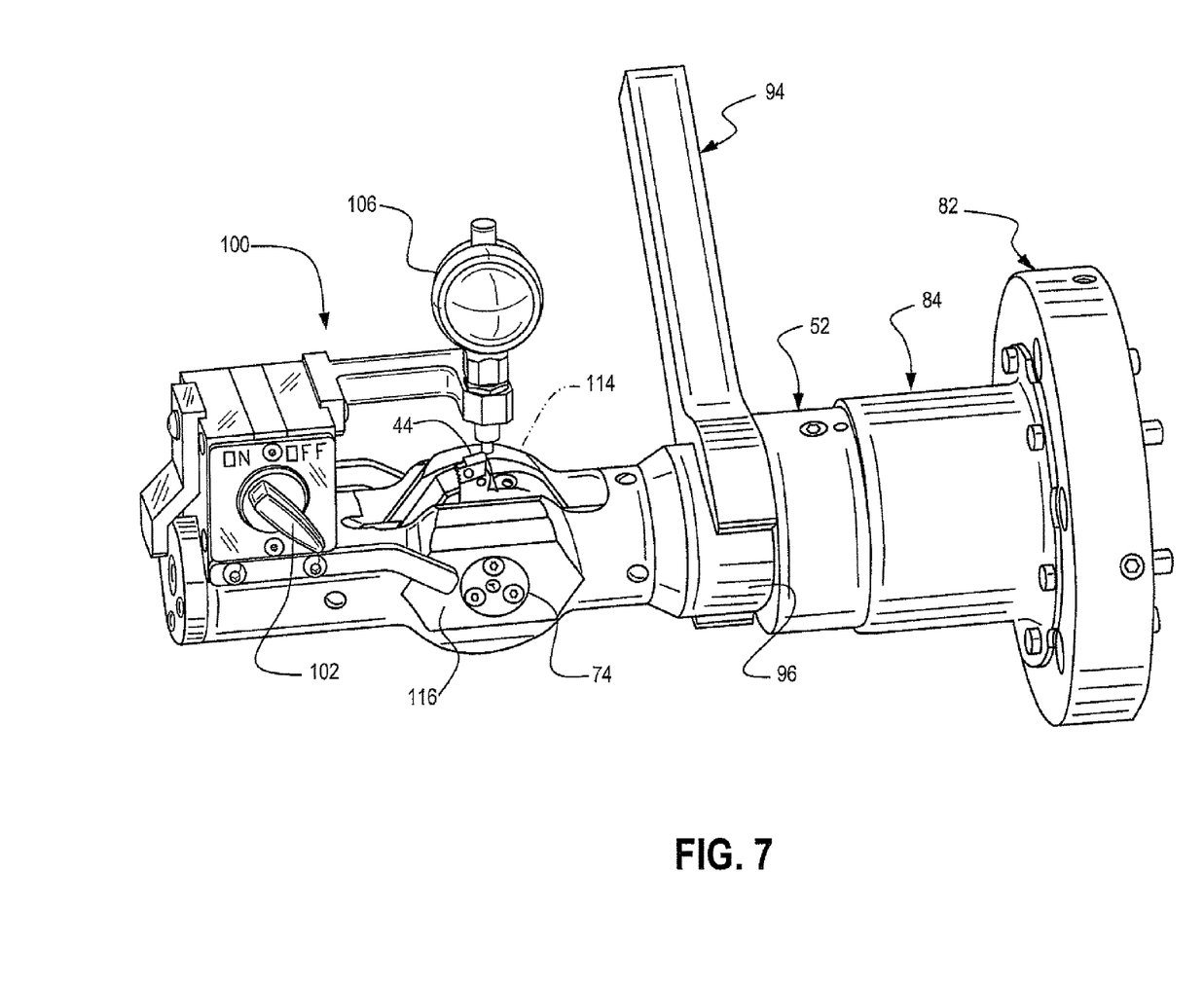
FIG. 7 is a perspective view of the cutter set-up gauge illustrated in FIG. 6 magnetically attached, connected to the rotary motion cutting tool for adjustment of the cutter position, and illustrating a turret-mounted tool retract system according to an embodiment of the invention.

Referring now to FIGS. 6-7, a cutter adjustment gauge 100 is illustrated. A switch 102 is provided to turn a gauge magnet between the on and off positions. Initially, the gauge magnet switch 102 is turned to the off position. The gauge 100 is installed on a reference set-up block 104 as illustrated in FIG. 6, and the magnet switch 102 is turned to the on position. The indicator 106 is set to measure, and the indicator 106 is adjusted to zero. The magnetic switch 102 is then turned to the off position and the gauge 100 is removed from the set-up block 104. Referring now to FIG. 7, the gauge 100 is positioned over the cutting edge of the cutter 44 as illustrated. The magnet switch 102 is turned to the on position. As best seen in FIG. 2A, the wedge screw 50 is loosened by being turned counter-clockwise. The cartridge adjusting screw 88 is turned counter-clockwise to make the cutting diameter smaller than the required size (to remove any backlash). The wedge 48 is snugged up to the cartridge 42 by turning the adjusting screw 88 clockwise to increase the cutting size until the indicator 106 (best seen in FIG. 7) reads zero. As best seen in FIG. 7, the magnetic switch 102 is then turned to the off position and the gauge 100 is removed from the rotary motion cutting tool 10. As illustrated in FIGS. 1, 3, 4, and 7, the flats 110, 112 on the rotary slides 22, 24 are oriented to the flats 114, 116 on the sphere positioning body 52. The cutting edges of the cutter 44 are in the startup cut position when located toward the distal end 56 of the rotary motion cutting tool 10.

A rotary motion cutting tool 10 according to an embodiment of the present invention provides rough and finish full sphere differential case processing for use with computer numeric controlled machines, or equipment that pulls, pushes, or turns to create axial movement of the actuating plate for rotary actuation to occur. The rotary motion cutting tool 10 provides rough and finish sphere surfaces in a single pass. The rotary motion cutting tool 10 is in balance during all portions of the cutting tool movement through the arc of the processing cut. The cutting tool components are supported for maximum stability. The cutter support cartridge provides adjustable roughing insert and micro-finishing insert calibration. Greater tool life can be achieved over other methods using the rotary motion cutting tool 10 according to one of the illustrated embodiments. Machine tool cost reduction can be provided with the rotary motion cutting tool according to one of the illustrated embodiments over other known methods. A 300% to 500% work cycle reduction can be achieved with the rotary motion cutting tool 10 over other known methods. The rotary motion cutting tool can be mounted on sub-spindle, secondary spindle, or spindle computer numeric controlled lathes, or can be used on computer numeric controlled machining centers, or can be used with any equipment that pulls, pushes, or turns to create axial motion of the actuating plate for rotary actuation to occur. A rotary motion cutting tool 10 according to one of the illustrated embodiments provides superior part finishes and part quality over other known methods.

The rotary motion cutting tool 10 according to the invention can be practiced without a computer numeric controller, if desired. By way of example and not limitation, the rotary motion cutting tool 10 can be hydraulicly driven, servo motor driven, rotary motion driven, air driven, coolant driven, and any combination thereof. The rotary motion cutting tool 10 can be used in combination with a machining center, or lathe, if desired. The first spindle 76 does not rotate during a machining process, and can have a part fixture attached, and can optionally include a live center. The first spindle 76 can rotate to provide proper angular orientation of the workpiece and/or to accommodate workpiece loading ergonomics, if desired or necessary. The second spindle 78 supports the rotary motion cutting tool 10 for rotation during a machining process. It should be recognized that the axial motion of the actuating plate 36 can be accomplished by pushing off of the part itself (i.e. a portion of the workpiece can define the force application surface), if desired. The drive shaft or draw bar 66, actuating plate 36, and actuating plate extender 36a are illustrated as being separate pieces in order to facilitate tool assembly. The joint 98 between the separate pieces 66, 36, 36a can be any desired configuration. By way of example and not limitation, the joint 98 can be a "hook-type" connection as illustrated in FIG. 1A, or a "tree-type" snap-on configuration as illustrated in FIG. 1B. The actuating plate extension 36a can be assembled to the actuating plate 36 with any desired connection and is not limited to a plurality of long screws as illustrated in FIG. 1A. The separate pieces, i.e. rotary actuators 28, 30, drive shaft 66, and actuating plate 36, allow assembly of the components within the "window" of the tool body, which is a small area linearly.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A rotary motion cutting tool having an axis of rotation for use in cutting at least a portion of a spherical surface on an internal surface of a workpiece, the rotary motion cutting tool comprising:
    at least one rotary slide rotatably supported with respect to a rotary axis extending generally perpendicular to the axis of rotation;
    at least one rotary actuator rotatably supported with respect to the at least one rotary slide for rotation about a rotary actuator support axis spaced radially from and generally parallel with the rotary axis of the at least one rotary slide;
    an actuating plate driven in reciprocal movement along the axis of rotation and having at least one rotary surface machined therein for interaction with the at least one rotary actuator, wherein reciprocal movement of the actuating plate translates through the rotary surface and rotary actuator into rotary movement of the rotary slide through an arc about the rotary axis;
    a sphere positioning body engageable with a force application surface and having a sphere position center at a distal end, the sphere positioning body supporting the rotary slide for rotation with respect to the rotary axis and for rotation with respect to the axis of rotation of the cutting tool;
    a feed control module supporting the sphere positioning body for rotation therewith, the feed control module moveable axially with respect to the sphere positioning body; and
    at least one biasing member for urging the sphere positioning body axially away from the feed control module.

2. The rotary motion cutting tool of claim 1 further comprising:
    at least one cutter support cartridge adjustably connectible to the at least one rotary slide, 3. The rotary motion cutting tool of claim 1 further comprising:
    at least one cutter associated with each rotary slide, wherein the cutter is driven through the arc of movement about the rotary axis in response to reciprocal movement of the actuating plate.

4. The rotary motion cutting tool of claim 3 further comprising:
    means for connecting the at least one cutter to the associated rotary slide.

5. The rotary motion cutting tool of claim 1 further comprising:
    at least one linear aligner extending through the sphere positioning body, the feed control module, and extending into at least a portion of the actuating plate.

6. The rotary motion cutting tool of claim 5 further comprising:
    a primary stable support and a secondary stable support associated with the sphere positioning body for supporting the actuating plate; and
    a rotary slide locating pivot supported by the sphere positioning body and operably engaging the rotary slide.

7. A rotary motion cutting tool having an axis of rotation for cutting at least a portion of a spherical surface on an internal surface of a workpiece, the rotary motion cutting tool comprising;
    a first spindle adjacent an end of a workpiece to be processed and a second spindle adjacent an opposite end of the workpiece to be processed, the first spindle lockable in a predetermined orientation with respect to the workpiece to be processed, and the second spindle independently rotatable and independently axially moveable with respect to the first spindle;
    at least one rotary slide rotatably supported with respect to a rotary axis extending generally perpendicular to the axis of rotation;
    at least one rotary actuator rotatably supported with respect to the at least one rotary slide for rotation about a rotary actuator support axis spaced radially from and generally parallel with the rotary axis of the at least one rotary slide; and
    an actuating plate driven in reciprocal movement along the axis of rotation and having at least one rotary surface machined therein for interaction with the at least one rotary actuator, wherein reciprocal movement of the actuating plate translates through the rotary surface and rotary actuator into rotary movement of the rotary slide through an arc about the rotary axis.

8. A rotary motion cutting tool having an axis of rotation for cutting at least a portion of a spherical surface on an internal surface of a workpiece, the rotary motion cutting tool comprising:
    a first rotary slide and a second rotary slide, each rotary slide rotatably supported with respect to a common rotary axis extending generally perpendicular to the axis of rotation;
    a first rotary actuator and a second rotary actuator rotatably supported with respect to the first and second rotary slides, respectively, for rotation about first and second rotary actuator support axes spaced radially from and generally parallel with the common rotary axis of the rotary slides; and an actuating plate driven in reciprocal movement along the axis of rotation and having a first rotary surface and a second rotary surface machined therein for interaction with the first and second rotary actuators, respectively, wherein reciprocal movement of the actuating plate translates through the first and second rotary surfaces, and the first and second rotary actuators, into synchronized rotary movement of the first and second rotary slides through first and second arcs about the rotary axis while maintaining rotational balance with respect to the axis of rotation.

9. The rotary motion cutting tool of claim 8 further comprising:
a cutter support cartridge adjustably connectible to each rotary slide.

10. The rotary motion cutting tool of claim 8 further comprising:
a cutter associated with each rotary slide, wherein the cutter is driven through the arc of movement about the rotary axis in response to reciprocal movement of the actuating plate.

11. The rotary motion cutting tool of claim 10 further comprising:
means for connecting the cutter associated with each rotary slide.

12. The rotary motion cutting tool of claim 8 further comprising:
a sphere positioning body engageable with a force application surface and having a sphere position center at a distal end, the sphere positioning body supporting the rotary slides for rotation with respect to the rotary axis and for rotation with respect to the axis of rotation of the cutting tool.

13. The rotary motion cutting tool of claim 12 further comprising:
a feed control module supporting the sphere positioning body for rotation therewith, the feed control module moveable axially with respect to the sphere positioning body; and
a biasing member for urging the sphere positioning body axially away from the feed control module.

14. The rotary motion cutting tool of claim 13 further comprising:
at least one linear aligner extending through the sphere positioning body, the feed control module, and into at least a portion of the actuating plate.

15. The rotary motion cutting tool of claim 14 further comprising:
a primary stable support and a secondary stable support associated with the sphere positioning body for supporting the actuating plate; and
a rotary slide locating pivot supported by the sphere positioning body and operably engaging a respective rotary slide.

16. The rotary motion cutting tool of claim 8 further comprising:
a first spindle and a second spindle, the first spindle lockable in a predetermined orientation with respect to a workpiece to be processed, and the second spindle independently rotatable and independently axially moveable with respect to the first spindle.

17. A process for cutting at least a portion of a spherical surface on an internal surface of a workpiece with rotary motion cutting tool having an axis of rotation, the process comprising:
orienting a first spindle in a predetermined locked position;
orienting a second spindle in a predetermined start position;
positioning the second spindle within a workpiece to make contact with a force application surface for at least a portion of the spherical surface to be machined;
rotating the second spindle while the first spindle remains stationary in the locked position;
advancing the second spindle against spring pressure in the rotary tool at a predetermined feed rate until a predetermined depth is reached;
stopping the second spindle rotation; and
orienting the second spindle to the start position.

18. The process of claim 17 further comprising:
positioning a tool retract system to contact a body of the rotary tool;
retracting the second spindle, and the tool retract system simultaneously;
feeding the tool retract system to unload stored spring pressure in rotary tool; and
removing the tool retract system from contact with the body of the rotary tool.

19. The process of claim 17 wherein the step of advancing the second spindle further comprises the step of:
selectively rotating a rotary slide having a cutter about an axis perpendicular to a rotational axis of the second spindle thereby selectively positioning the cutter in cutting engagement with the workpiece.

20. The process of claim 19 wherein the step of selectively positioning the cutter in cutting engagement with the workpiece further comprises the step of axially moving an actuating plate operably engaged with the rotary slide to selectively adjust the radial position of the cutter with respect to a rotary axis of the rotary slide.

* * * * *